United States Patent
Mack

(10) Patent No.: US 6,301,090 B1
(45) Date of Patent: Oct. 9, 2001

(54) CONTROL SYSTEM USING AN ELECTRIC MOTOR

(75) Inventor: Rolf Mack, Sinzheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/308,425

(22) PCT Filed: Aug. 7, 1998

(86) PCT No.: PCT/DE98/02268

§ 371 Date: May 17, 1999

§ 102(e) Date: May 17, 1999

(87) PCT Pub. No.: WO99/14835

PCT Pub. Date: Mar. 25, 1999

(30) Foreign Application Priority Data

Sep. 18, 1997 (DE) .............................. 197 41 245
Apr. 16, 1998 (DE) .............................. 198 16 837

(51) Int. Cl.[7] .................................................. H02H 5/00
(52) U.S. Cl. ........................... 361/25; 361/103; 361/115
(58) Field of Search ................................ 361/25, 103, 115

(56) References Cited

U.S. PATENT DOCUMENTS 4,977,507 * 12/1990 Matsuoka et al. ............... 364/424.05

FOREIGN PATENT DOCUMENTS

WO 94/27349   11/1994 (WO) ..................... H02H/7/085

* cited by examiner

*Primary Examiner*—Stephen W. Jackson
(74) *Attorney, Agent, or Firm*—Michael J. Striker

(57) ABSTRACT

The electric motor drive includes an electric motor (10); an end stage (12) for triggering the electric motor; a trigger circuit (18) for pulse-width-modulated triggering of the end stage, which is associated with the end stage (12) and which includes an overload stage (20) for detecting an overload on the electrical motor according to a temperature of the electric motor and a device for obtaining a temperature from a pulse-width-modulation signal (16) generated by the trigger circuit (18). A preferred embodiment includes a device for integrating a differential power ($P_{diff}$) equal to an instantaneous power ($P_{mom}$) minus an equipment specific limit power ($P_{limit}$) in predetermined time intervals to obtain an integrated power ($P_{new}$). The motor is turned on or off by comparison of the integrated power with various limiting values.

32 Claims, 1 Drawing Sheet

CONTROL SYSTEM USING AN ELECTRIC MOTOR

BACKGROUND OF THE INVENTION

1. Field of the Invention

The invention relates to an electric motor drive, having an electric motor that is triggerable via an end stage.

2. Prior Art

Electric motor drives of this generic type are known. They are used for instance in motor vehicles, as control motors. They are then operated at a supply voltage furnished by a motor vehicle battery. The electric motors embodied as direct current motors can be used in thermally critical areas of the motor vehicle, such as in the immediate vicinity of an internal combustion engine, among other areas. It is also known to provide electric motor drives with an overload protection that is intended to protect the electric motors against irreparable thermal damage, for instance if sluggishness suddenly occurs.

To protect electric motors against thermal overload, it is known to detect a housing temperature and/or an armature winding temperature of the direct current motor via a temperature sensor or a bimetallic element. The electric motor is rendered currentless if a permissible temperature is exceeded.

It is also known for electric consumers, such as motor end stages for direct current motors in motor vehicles, to be triggered with a pulse-width modulation signal. The electric consumer is connected to a voltage source or disconnected from the voltage source in accordance with a duty factor of the pulse-width modulation signal.

From International Patent Disclosure WO 94/27349, an electric motor drive is known in which a motor end stage is connected to a trigger circuit, and the trigger circuit generates an overload signal as a function of a temperature of the electric motor. A temperature of the electric motor can be calculated here from a power loss, or a variable proportional to it, on the basis of measured motor data during the duty cycle of the electric motor and integrated; for forwarding the overload signal, the integration value is compared with a predeterminable threshold value. A disadvantage here is that the requisite measurement of motor data during the duty cycle of the electric motor dictates effort and expense for measurement that moreover involves error, so that an exact overload signal cannot be ascertained.

SUMMARY OF THE INVENTION

It is an object of the present invention to provide an improved electric motor drive, which is simpler and less complex than those of the prior art.

According to the invention the electric motor drive comprises an electric motor; an end stage comprising means for triggering the electric motor; a trigger circuit associated with the end stage, the trigger circuit having a microprocessor and comprising means for pulse-width-modulated triggering of the end stage, the trigger circuit including an overload stage, the overload stage comprising means for detecting an overload on the electrical motor according to a temperature of the electric motor and means for obtaining the temperature from a pulse-width-modulation signal generated by the trigger circuit without means for directly measuring operating parameters of the electric motor, the means for directly measuring operating parameters including current measuring means or temperature measuring means.

The electric motor drive of the invention has the advantage over the prior art that in a simple way, an exact overload signal for turning off the electric motor drive can be furnished. Because the temperature of the electric motor is obtained from a pulse-width modulation signal of the trigger circuit, measurement of motor data during electric motor operation can be dispensed with. The complexity of the circuitry is thus simplified considerably. Sources of error associated with measuring motor data during operation are also circumvented, so that the signal can be generated with high accuracy. Ascertaining the motor temperature is done solely on the basis of already existing signals, namely the pulse-width modulation signal for triggering the electric motor. No other additional direct measurements of operating parameters of the motor, such as a current or a temperature, are necessary.

Other preferred features of the invention will become apparent from the other characteristics recited in the dependent claims.

BRIEF DESCRIPTION OF THE DRAWING

The invention will be described in detail below in terms of an exemplary embodiment in conjunction with the associated drawing, which shows a block circuit diagram of an electric motor drive.

DESCRIPTION OF THE EXEMPLARY EMBODIMENT

Figure 1:
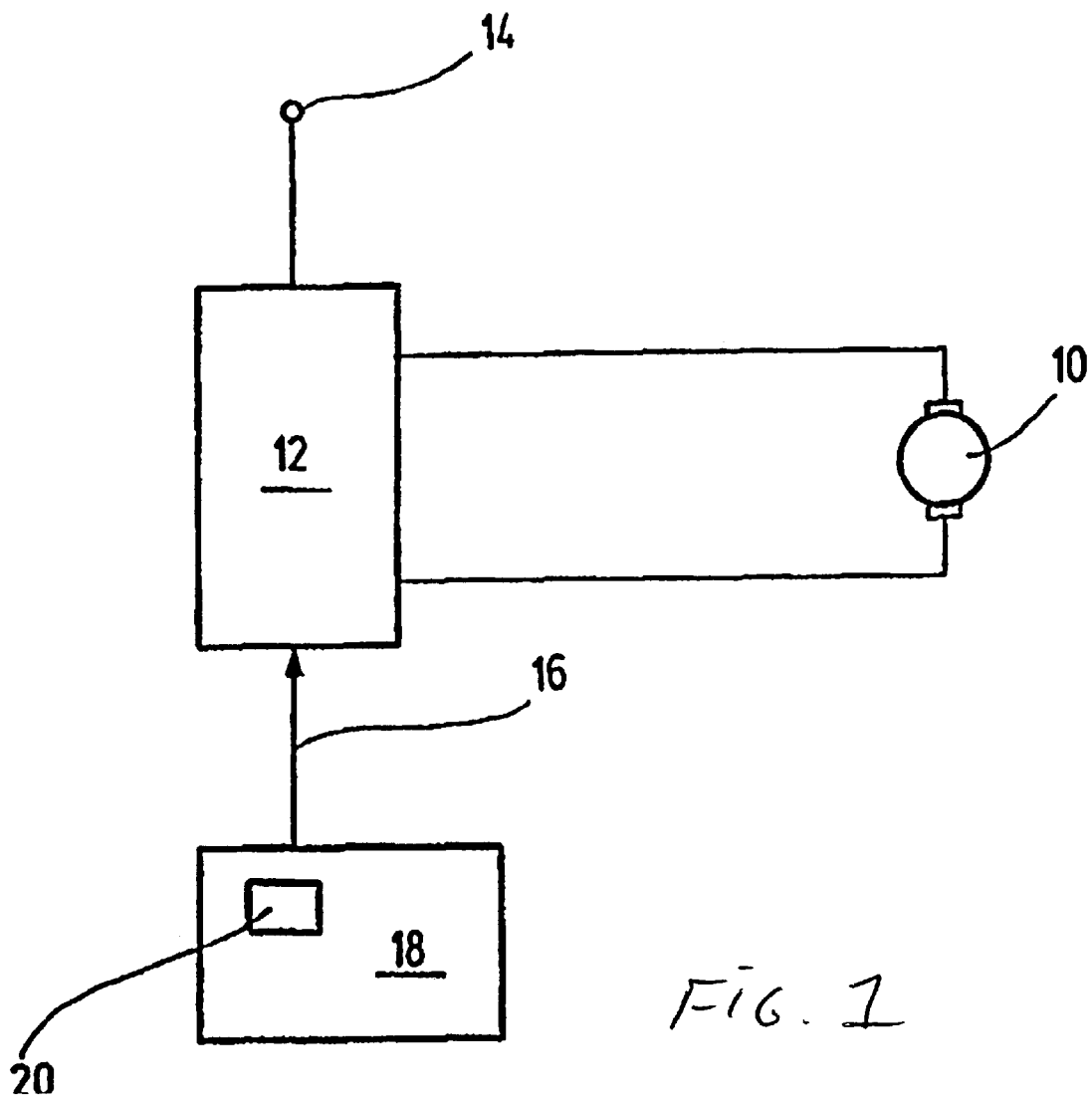

FIG. 1, in a block circuit diagram, shows an electric motor drive. The electric motor drive includes a direct current motor 10, which acts for instance as a control motor in a motor vehicle. The direct current motor 10 is connected to an end stage 12, which has switch means for connecting the direct current motor 10 to an energy source 14. In motor vehicles, the energy source is a motor vehicle battery, for example. The switching stage 12 is supplied with a control signal 16, which is furnished by a trigger circuit 18. By means of the trigger circuit 18, a pulse-width-modulated triggering of the switching stage 12 is effected, so that a clocked mode of operation of the direct current motor 10 is During the intended use of the direct current motor 10, this motor, for instance from sluggishness or the presence of an obstacle in a controlled path of a final control element that is movable with the direct current motor 10, can become mechanically and thermally overloaded, so that temperature monitoring of the direct current motor 10 is necessary in order that an overload signal will be generated at the correct time. To that end, an overload stage 20 is integrated with the trigger circuit 18.

The ascertainment of a temperature of the direct current motor 10 by means of the overload stage 20 is done on the basis of a temperature model, as follows:

It is known that the temperature of the direct current motor 10 depends on a delivered and an output power. The equation is $$P_t = P_{del} - P_{out}$$

where $P_t$ stands for the temperature power of the direct current motor, $P_{del}$ stands for the delivered power and $P_{out}$ stands for the output power. The output power $P_{out}$ can be ascertained from an endurance run test, for instance, and assumed to be constant, for a predetermined, known design of the direct current motor.

The delivered power is obtained from the equation $$P_{del} = U \cdot I = U^2 / R;$$

U stands for the pulse-width modulated voltage signal 16 specified via the trigger circuit 18; I stands for the motor current; and R stands for the armature resistance of the motor. The resistance R can be assumed to be constant, ignoring any temperature dependency. Experience shows that the armature resistance R of the direct current motor 10 fluctuates by approximately 50% over a temperature range from −40° C. to +85° C., for example.

To ascertain the temperature of the direct current motor 10, a distinction must be made between two operating situations. In a first operating situation (the diabatic case), an armature of the direct current motor 10 is in motion, so that via carbon brushes, heat can be dissipated over the entire circumference of a commutator of the armature. A second situation (the adiabatic case) exists when the armature of the direct current motor 10 is stopped or is rotating only slightly. Then heat dissipation via the carbon brushes from the commutator is sharply restricted, so that faster heating of the armature and carbon brush can take place.

Ascertaining a temperature of the direct current motor 10 from the pulse-width modulation signal 16 of the trigger circuit 18 will now be explained. The temperature is ascertained here from a model calculation; that is, without direct temperature measurement, such as via a temperature sensor or the like. The temperature can be ascertained at certain time intervals. For instance, as the time interval for calculating the current temperature power $P_t$, the time-slot pattern of the digital pulse-width modulation signals can be selected. For example, the calculation can be done at each edge at a transition of the digital signal from OFF to ON and/or from ON to OFF. However, it is expedient to perform the calculation in a time interval that takes only every $n^{th}$ control value (each $n^{th}$ edge) into account. By means of a filter, the $n^{th}$ value to be taken into account can be ascertained.

An instantaneous power $P_{mom}$ is obtained from squaring the instantaneous digital pulse-width modulation signal 16 $PWM_{mom}$. This corresponds to the current output of the pulse-width modulation signal 16 to the switching stage 12. That is:

$$P_{mom}=PWM_{mom} \cdot PWM_{mom}.$$

A countervoltage occurring in the direct current motor 10 as the rpm increases is not taken into account but instead is assumed on average to be a proportional factor that can be taken into account by ensuing parametrizing.

Next, a maximum allowable power $P_{limit}$ that is dependent on the specific direct current motor 10 is subtracted from the calculated power $P_{mom}$, resulting in a differential power $P_{diff}$ as follows:

$$P_{diff}=P_{mom}-P_{limit}.$$

For each time interval ($n^{th}$ edge of the signal 16) used for calculating the instantaneous power, the differential power $P_{diff}$ is integrated; the equation is:

$$P_{new}=P_{old}+P_{diff}.$$

If the thus-integrated power $P_{new}$ attains a warning power $P_{warn}$ that can be defined for the direct current motor, then via the trigger circuit 18, the pulse-width modulation signal 16 for the switching stage 12 can be varied in such a way that a less power-intensive triggering is done. This reduces the temperature load on the direct current motor 10. By further integration of the differential power $P_{diff}$ a definable turnoff threshold $P_{max}$ is attained, at which the direct current motor 10 is turned off. At the same time, as the calculation continues in each defined time interval, a lowering of the integration value $P_{new}$ is done linearly by the limit power $P_{limit}$. The direct current motor 10 can be turned on whenever the integration value $P_{new}$ has attained a definable limit $P_{min}$. When the direct current motor 10 is turned on via the pulse-width modulation signal 16, the integration to the power $P_{new}$ starts over again, in the sequence described.

By means of a characteristic continuous-operation program that is adapted to the specific direct current motor 10 and its specific usage condition, the maximum allowable continuous load can be simulated. The worse possible conditions, for instance with regard to an ambient temperature and humidity should be taken into account optionally taking into account forced cooling in conjunction with a representative or average expected load moment. The maximum allowable continuous load can be ascertained by setting the ambient temperature and optionally the humidity to the worst possible values to be expected. Next, a continuous operation cycle and/or a load moment is increased in increments, until a temperature of the direct current motor 10 that is still just barely permissible is reached. On the basis of existing time constants, a value that is just below the ascertained allowable value must be ascertained, so as to ascertain the allowable continuous load. Under these then-selected load parameters, the direct current motor 10 is operated in the continuous load mode; stable conditions ensue after a time equivalent to approximately three to five times a thermal system time constant of the direct current motor 10. The pulse-width modulation signals 16 corresponding to these conditions are detected by the trigger circuit 18 and stored in memory and used in the later temperature determination under usage conditions.

The limit power $P_{limit}$ is ascertained from the increase over time in the integration value $P_{new}$, which is initially still calculated assuming $P_{limit}=0$ and thus rises monotonously. Taking the then-ascertained value for the limit power $P_{limit}$ has the effect that at the maximum allowable load on the direct current motor 10, the integration value $P_{new}$ remains unchanged. The warning power $P_{warn}$ is defined below the turnoff power $P_{max}$.

To enable taking the aforementioned adiabatic case into account as well, in which extreme heating exists because of the lack of heat dissipation via the carbon brushes, it is provided that the instantaneous power $P_{mom}$ filtered with a filter power $P_{filter}$. The filter power is obtained here from the following equation $$P_{filter} = K \cdot \frac{T_a}{(T_a+T) \cdot P_{mom}} + \frac{T}{(T_a+T) \cdot P_{filter}},$$

in which K is an amplification factor, $T_a$ is a sampling time, and T is a tau value.

If the filter power $P_{filter}$ exceeds a warning power $P_{warn}$, then a switchover can be made to a less thermally burdensome control strategy for triggering the direct current motor 10. If the turnoff power $P_{max}$ is exceeded, the direct current motor 10 is turned off. The filter power $P_{filter}$ then drops with a time constant until a minimal power $P_{min}$ is reached. At that time, the filter power $P_{filter}$ remains constant, and the direct current motor 10 can be turned on again.

The time constant of the filter is on the order of magnitude of that with which the direct current motor 10 is heated, by a maximum possible load, from its operating temperature to a critical temperature. Parametrization is done by analysis of a brief maximum allowable load with the critical temperature. This brief load has an order of magnitude of approximately three times the value of the time constant. For example, the maximum allowable load can be caused by a runup of the direct current motor at maximal load at the least favorable ambient temperature to be expected. The filter power $P_{filter}$ is initially implemented without the turnoff power $P_{max'}$, and thus the maximum filter power $P_{filter}$ attained at the maximum load is ascertained. The turnoff power $P_{max'}$ is then selected to be slightly greater than this attained maximum filter power $P_{filter}$. The warning power $P_{warn'}$ is again selected to be below the turnoff power $P_{max'}$.

The two aforementioned operating cases, that is, the diabatic and the adiabatic cases, will occur in mixed form when the direct current motor 10 is used as intended. In this sense, it is necessary to link these ascertained values. An OR linkage of the warning power $P_{warn}$ in the diabatic case is linked with the warning power $P_{warn'}$ of the adiabatic case. Once again, a turnoff of the direct current motor 10 is done by means of an OR linkage of the two turnoff powers $P_{max}$ and $P_{warn'}$ of the diabatic and the adiabatic case, respectively. Turning the direct current motor 10 back on again is possible only if in both cases turning it back on again is permitted; that is, if the minimal power $P_{min}$ of the diabatic case and of the adiabatic case are linked by an AND linkage.

In summary, by a simple design and embodiment of the trigger circuit 18 with the overload stage 20, it is possible to vary the pulse-width modulation signal 16 for triggering the direct current motor 10. No additional temperature measurements or current measurements are necessary. The overload stage 20 need merely be informed of an initial temperature. This may for instance be the synthetic specification of an initial value that corresponds to the worst possible operating conditions of the direct current motor 10. It is also conceivable for an ambient temperature, furnished by other sensors, such as temperature sensors disposed inside a motor vehicle, to be linked with an OFF time of the direct current motor 10, in order in this way to generate an initial value.

What is claimed is:

1. An electric motor drive, comprising an electric motor (10); an end stage (12) comprising means for triggering the electric motor; a trigger circuit (18) associated with the end stage (12), said trigger circuit (18) having a microprocessor and comprising means for pulse-width-modulated triggering of the end stage, said trigger circuit (18) including an overload stage (20), said overload stage comprising means for detecting an overload on the electrical motor according to a temperature of the electric motor; means for obtaining said temperature from a pulse-width-modulation signal (16) generated by the trigger circuit (18); means for calculating an instantaneous power ($P_{mom}$) from the pulse-width-modulation signal (16) and means for integrating a differential power ($P_{diff}$) in each of a number of predetermined time intervals to obtain an integrated power ($P_{new}$), said differential power being equal to said instantaneous power ($P_{mom}$) minus an equipment specific limit power ($P_{limit}$).

2. The electric motor drive as defined in claim 1, further comprising means for evaluating the pulse-width-modulation signal at each $n^{th}$ edge.

3. The electric motor drive as defined in claim 1, further comprising means for varying the pulse-width-modulation signal (16) for triggering the electric motor (10) when the integrated power ($P_{new}$) reaches an equipment-specific warning power level ($P_{warn}$).

4. The electric motor drive as defined in claim 1, further comprising means for turning off the electrical motor (10), when the integrated power ($P_{new}$) reaches an equipment-specific turnoff power ($P_{max}$).

5. The electric motor drive as defined in claim 4, further comprising means for turning the electric motor (10) is turned back on again if the integrated power ($P_{new}$) in one of the predetermined time intervals attains or falls below an equipment-specific minimum power ($P_{min}$).

6. The electric motor drive as defined in claim 1, further comprising means for filtering the instantaneous power ($P_{mom}$) obtained from the pulse-width modulation signal (16) with a filter power ($P_{Filter}$).

7. The electric motor drive as defined in claim of claim 6, further comprising means for varying the pulse-width modulation signal (16) for triggering the electric motor (10) when the filter power ($P_{Filter}$) attains another equipment-specific warning power level ($P_{warn'}$).

8. The electric motor drive as defined in claim 6, further comprising means for turning off the electric motor (10) when the filter power ($P_{Filter}$) reaches an equipment-specific turnoff power.

9. The electric motor drive as defined in claim 8, further comprising means for turning the electric motor (10) back on again if the filter power ($P_{Filter}$) has dropped to an equipment-specific minimum power ($P_{min}$).

10. The electric motor drive as defined in claim 9, wherein the filter power ($P_{Filter}$) decreases with an equipment-specific time constant.

11. The electric motor drive as defined in claim 1, further comprising means for varying the pulse-width modulation signal (16) if a first warning power ($P_{warn}$) or a second warning power ($P_{warn'}$) is reached.

12. The electric motor drive as defined in claim 11, further comprising means for turning off the electric motor (10) when a first turnoff power ($P_{max}$) or a second turnoff power ($P_{max'}$) is reached.

13. The electric motor drive as defined in claim 12, further comprising turning the electric motor (10) back on again if a first minimum power ($P_{min}$) or a second minimum power ($P_{min'}$) is reached.

14. An electric motor drive, comprising an electric motor (10); an end stage (12) comprising means for triggering the electric motor; a trigger circuit (18) associated with the end stage (12), said trigger circuit (18) having a microprocessor and comprising means for pulse-width-modulated triggering of the end stage, said trigger circuit (18) including an overload stage (20), said overload stage comprising means for detecting an overload on the electrical motor according to a temperature of the electric motor; means for obtaining said temperature from a pulse-width-modulation signal (16) generated by the trigger circuit (18); means for obtaining an instantaneous power ($P_{mom}$) from the pulse-width-modulation signal (16) and means for filtering the instantaneous power ($P_{mom}$) obtained from the pulse-width-modulation signal (16) with a filter power ($P_{Filter}$).

15. The electric motor drive as defined in claim 14, further comprising means for evaluating the pulse-width-modulation signal at each $n^{th}$ edge.

16. The electric motor drive as defined in claim 14, further comprising means for turning off the electrical motor (10), when an integrated power ($P_{new}$) reaches an equipment-specific turnoff power ($P_{max}$).

17. The electric motor drive as defined in claim 14, further comprising means for turning off the electric motor (10) when the filter power ($P_{Filter}$) reaches an equipment-specific turnoff power.

18. The electric motor drive as defined in claim 16, further comprising means for turning the electric motor (10) back on again if the filter power ($P_{Filter}$) has dropped to an equipment-specific minimum power ($P_{min}$).

19. The electric motor drive as defined in claim 17, wherein the filter power ($P_{Filter}$) decreases with an equipment-specific time constant.

20. An electric motor drive, comprising an electric motor (10); an end stage (12) comprising means for triggering the electric motor; a trigger circuit (18) associated with the end stage (12), said trigger circuit (18) having a microprocessor and comprising means for pulse-width-modulated triggering of the end stage, said trigger circuit (18) including an overload stage (20), said overload stage comprising means for detecting an overload on the electrical motor according to a temperature of the electric motor and means for obtaining said temperature from a pulse-width-modulation signal (16) generated by the trigger circuit (18) without means for directly measuring operating parameters of the electric motor, said means for directly measuring operating parameters including current measuring means or temperature measuring means.

21. The electric motor drive as defined in claim 20, wherein the pulse-width modulation signal (16) is evaluated in pre-selected time intervals.

22. The electric motor drive as defined in claim 20, further comprising means for integrating a differential power ($P_{diff}$) in each of a number of predetermined time intervals to obtain an integrated power ($P_{new}$), said differential power being equal to an instantaneous power ($P_{mom}$) minus an equipment specific limit power ($P_{limit}$), said instantaneous power being obtained from the pulse-width-modulation signal (16).

23. The electric motor drive as defined in claim 22, further comprising means for varying the pulse-width-modulation signal (16) for triggering the electric motor (10) when the integrated power ($P_{new}$) reaches an equipment-specific warning power level ($P_{warn}$).

24. The electric motor drive as defined in claim 22, further comprising means for turning off the electrical motor (10), when the integrated power ($P_{new}$) reaches an equipment-specific turnoff power ($P_{max}$).

25. The electric motor drive as defined in claim 24, further comprising means for turning the electric motor (10) is turned back on again if the integrated power ($P_{new}$) in one of the predetermined time intervals attains or falls below an equipment-specific minimum power ($P_{min}$).

26. The electric motor drive as defined in claim 22, further comprising means for filtering the instantaneous power ($P_{mom}$) obtained from the pulse-width modulation signal (16) with a filter power ($P_{Filter}$).

27. The electric motor drive as defined in claim of claim 26, further comprising means for varying the pulse-width modulation signal (16) for triggering the electric motor (10) when the filter power ($P_{Filter}$) attains another equipment-specific warning power level ($P_{warn'}$).

28. The electric motor drive as defined in claim 26, further comprising means for turning off the electric motor (10) when the filter power ($P_{Filter}$) reaches an equipment-specific turnoff power.

29. The electric motor drive as defined in claim 28, further comprising means for turning the electric motor (10) back on again if the filter power ($P_{Filter}$) has dropped to an equipment-specific minimum power ($P_{min}$).

30. The electric motor drive as defined in claim 29, wherein the filter power ($P_{Filter}$) decreases with an equipment-specific time constant.

31. The electric motor drive as defined in claim 22, further comprising means for varying the pulse-width modulation signal (16) if a first warning power ($P_{warn}$) or a second warning power ($P_{warn'}$) is reached.

32. The electric motor drive as defined in claim 31, further comprising means for turning off the electric motor (10) when a first turnoff power ($P_{max}$) or a second turnoff power ($P_{max'}$) is reached.

* * * * *